(12) United States Patent
Kurungot et al.

(10) Patent No.: US 10,266,990 B2
(45) Date of Patent: Apr. 23, 2019

(54) PEDOT COATED FLEXIBLE CELLULOSE PAPER BY INTERFACIAL POLYMERIZATION

(71) Applicant: COUNCIL OF SCIENTIFIC & INDUSTRIAL RESEARCH, New Delhi (IN)

(72) Inventors: Sreekumar Kurungot, Maharashtra (IN); Bihag Anothumakkool, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 5 days.

(21) Appl. No.: 15/538,531

(22) PCT Filed: Dec. 23, 2015

(86) PCT No.: PCT/IN2015/050213
§ 371 (c)(1),
(2) Date: Jun. 21, 2017

(87) PCT Pub. No.: WO2016/103282
PCT Pub. Date: Jun. 30, 2016

(65) Prior Publication Data
US 2018/0237993 A1    Aug. 23, 2018

(30) Foreign Application Priority Data
Dec. 23, 2014 (IN) .............................. 3863/DEL/2014

(51) Int. Cl.
| | | |
|---|---|---|
| *D21H 19/24* | (2006.01) | |
| *D21H 27/00* | (2006.01) | |
| *D21H 17/46* | (2006.01) | |
| *H01B 1/12* | (2006.01) | |
| *C08L 65/00* | (2006.01) | |
| *C08L 81/00* | (2006.01) | |

(52) U.S. Cl.
CPC .............. *D21H 19/24* (2013.01); *C08L 65/00* (2013.01); *C08L 81/00* (2013.01); *D21H 17/46* (2013.01); *D21H 27/00* (2013.01); *H01B 1/127* (2013.01); *C08L 2203/204* (2013.01)

(58) Field of Classification Search
CPC .......... D21H 9/24; D21H 17/46; D21H 27/00; C08L 65/00; C08L 81/00; C08L 2203/204; H01B 1/127
USPC ....................................................... 428/537.5
See application file for complete search history.

(56) References Cited

U.S. PATENT DOCUMENTS

2006/0269664 A1* 11/2006 Gleason ................... B05D 1/60
427/248.1

FOREIGN PATENT DOCUMENTS

| WO | WO2006/130656 | * | 12/2006 |
| WO | WO 2006/130656 A2 | | 12/2006 |
| WO | WO2011/163556 | * | 12/2011 |
| WO | WO 2011/163556 A2 | | 12/2011 |

OTHER PUBLICATIONS

H. Kawashima et al: "Fabrication of conductive paper coated With PEDOT" JOCTR, vol. 9, No. 4, Nov. 8, 2011, pp. 467-474.*
International Search Report (ISR) for PCT/IN2015/050213; I.A. fd: Dec. 23, 2015, dated Apr. 1, 2016, European Patent Office, Rijswijk, Netherlands.
International Preliminary Report on Patentability (IPRP) including the Written Opinion of the International Searching Authority (PCT Rule 44bis) for PCT/IN2015/050213; I.A. fd: Dec. 23, 2015, dated Jun. 27, 2017, by the International Bureau of WIPO, Geneva, Switzerland.
Kawashima, H. et al., "Fabrication of conductive paper coated with PEDOT: preparation and characterization," J Coat Technol Res (2012) 9: 467, Jul. 2012, First Online: Nov. 8, 2011, doi:10.1007/s11998-011-9375-5, Springer-Verlag, Wein, NY.

* cited by examiner

*Primary Examiner* — Leszek B Kiliman
(74) *Attorney, Agent, or Firm* — Sterne, Kessler, Goldstein & Fox P.L.L.C.

(57) ABSTRACT

The present invention discloses a highly conducting polyethylenedioxythiphene (PEDOT) flexible paper with a very low sheet resistance and high conductivity and process for preparation thereof, by inducing the polymerization at the interface of two immiscible liquids on a cellulose paper to trigger PEDOT growth along the fibers of the cellulose paper. The present invention discloses the use of the said conducting paper for the preparation of flexible supercapacitor and for the preparation of counter electrode in Dye Sensitized Solar Cell (DSSC).

9 Claims, 6 Drawing Sheets

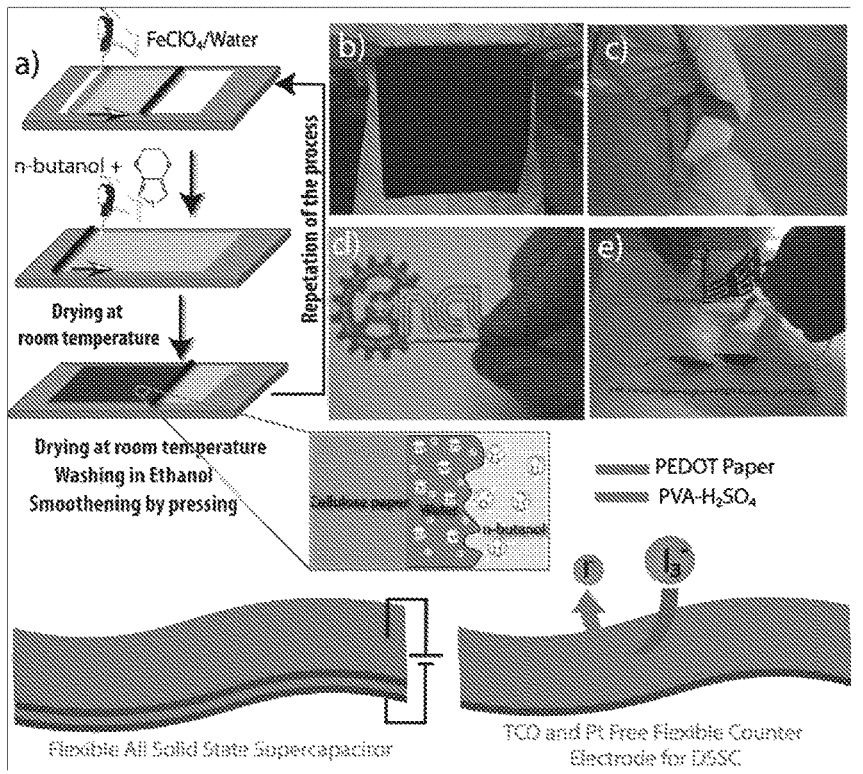
Figure: 1
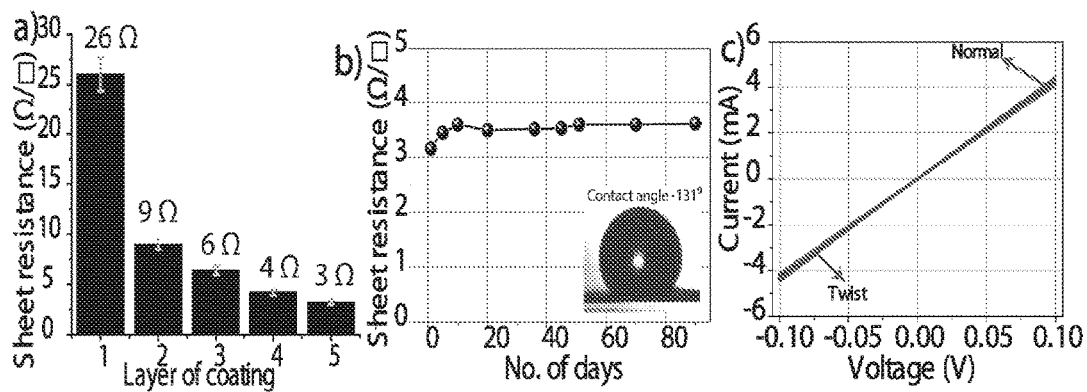
Figure: 2

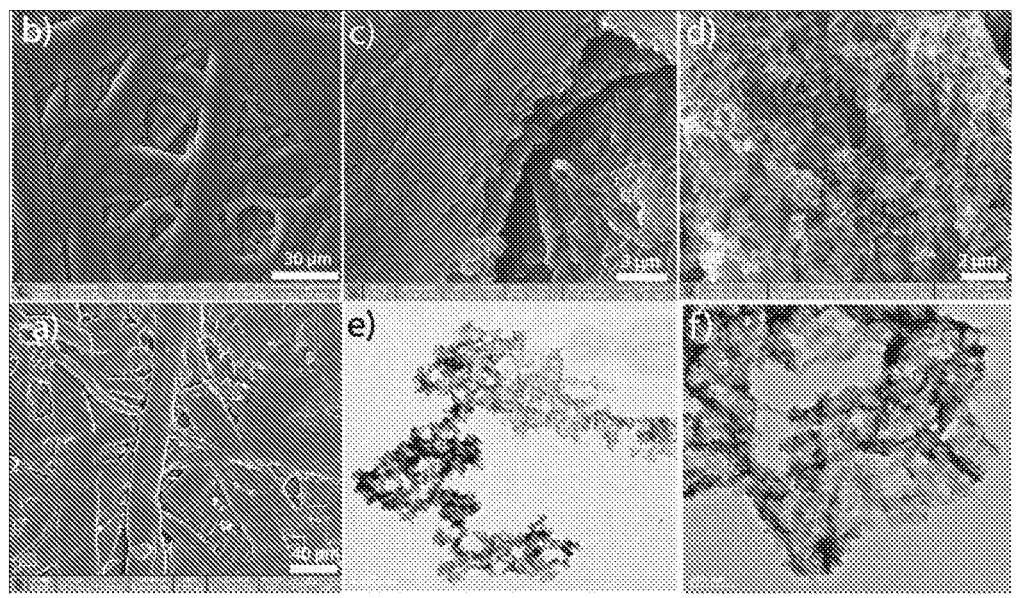
Figure: 3
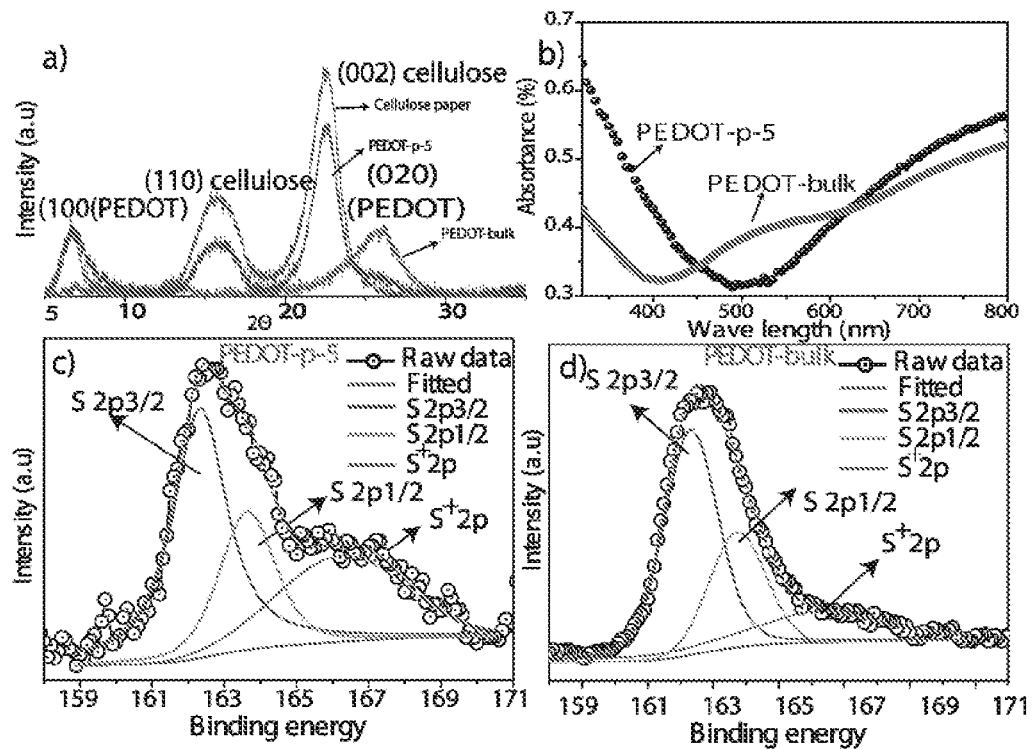
Figure: 4

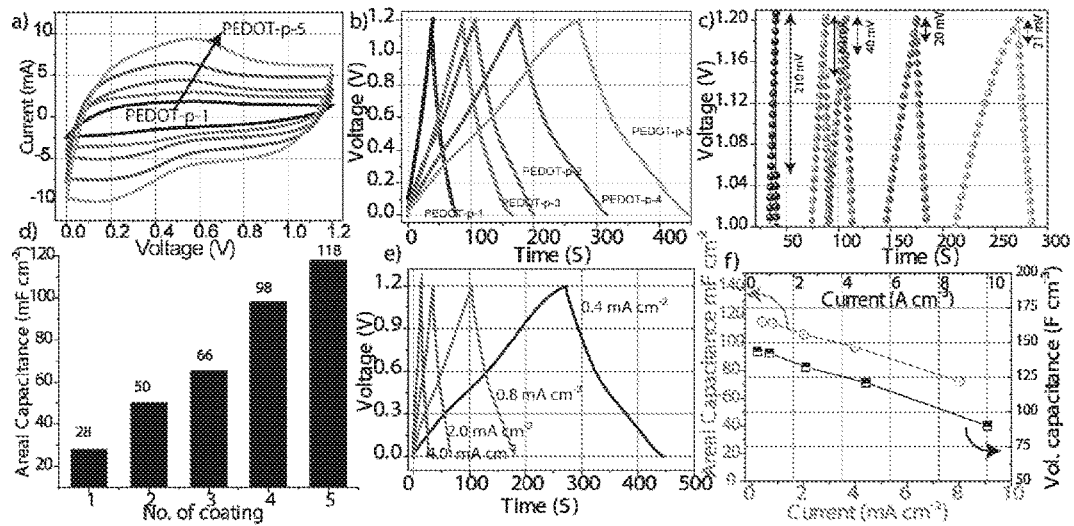
Figure: 5
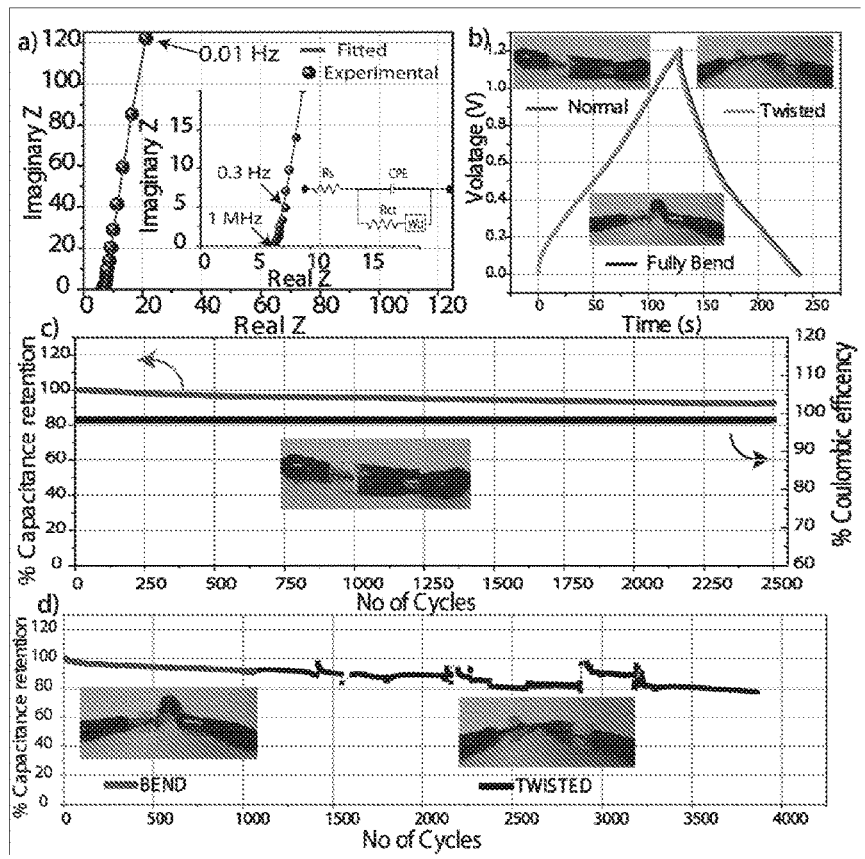
Figure: 6

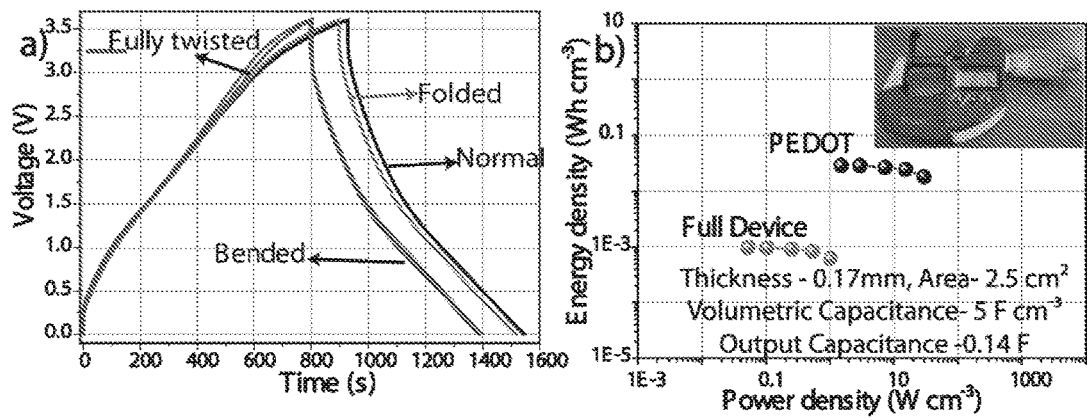
Figure: 7
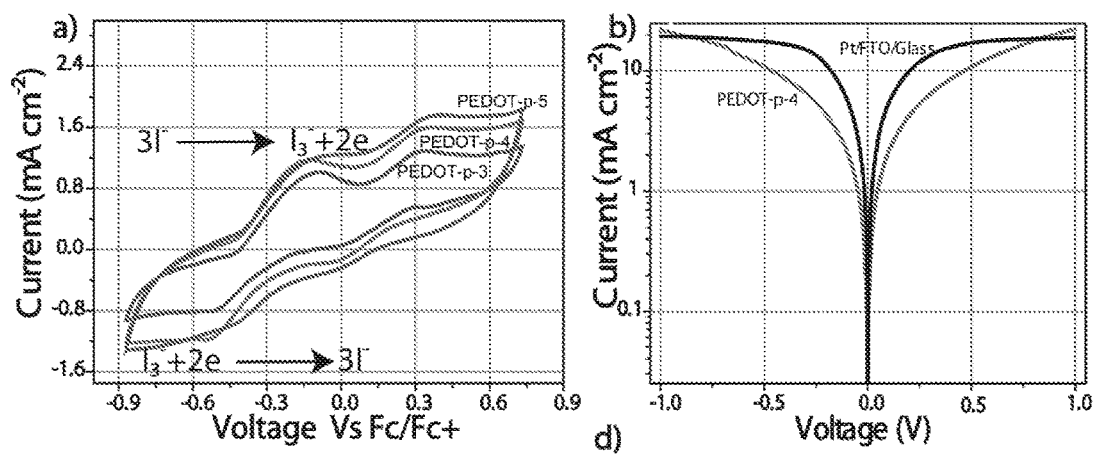
Figure: 8

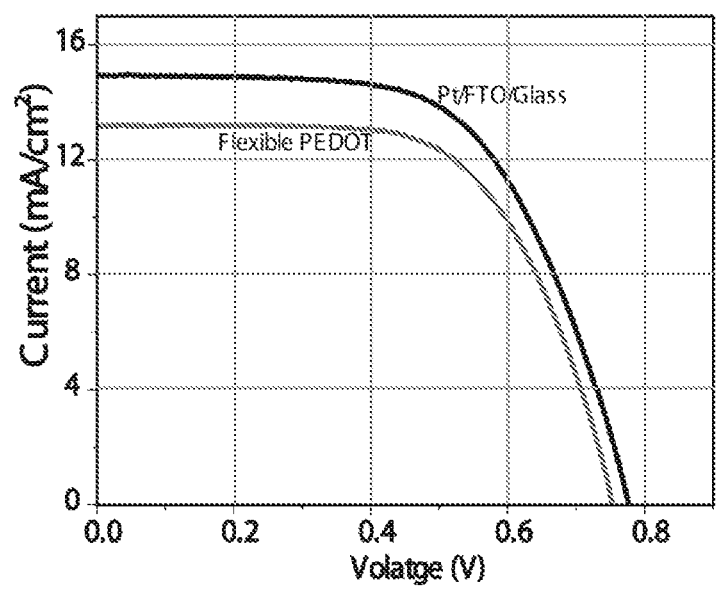
Figure: 9

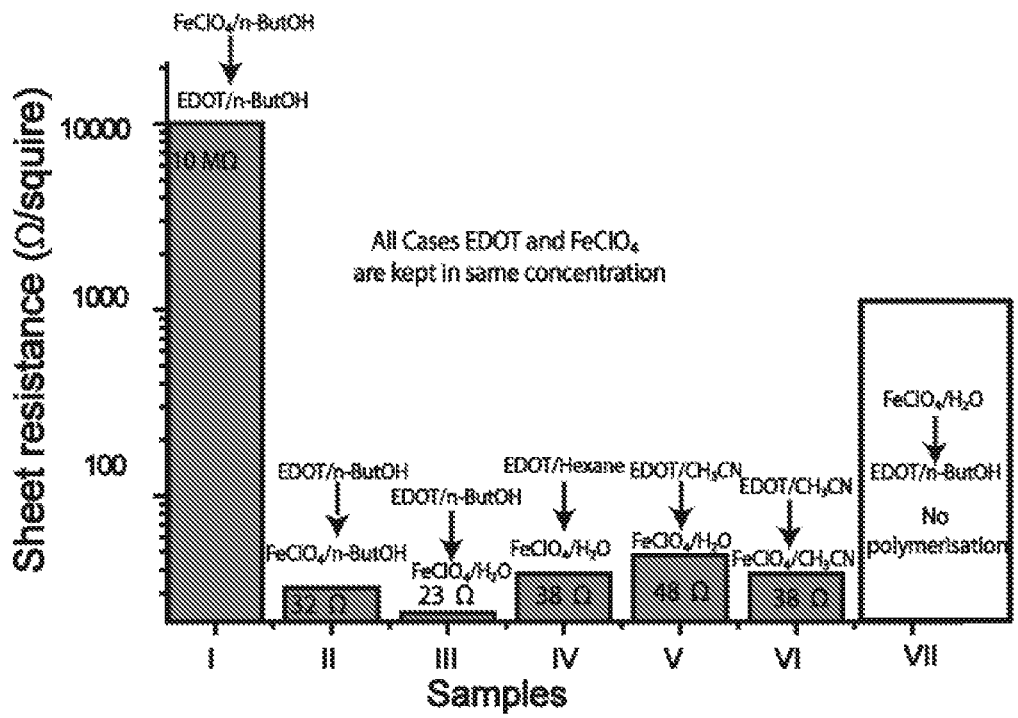
Figure: 10
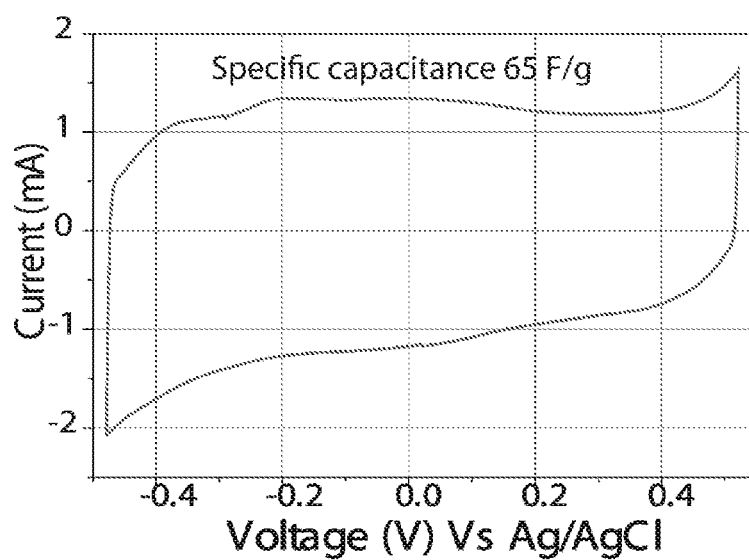
Figure: 11

PEDOT COATED FLEXIBLE CELLULOSE PAPER BY INTERFACIAL POLYMERIZATION

FIELD OF THE INVENTION

The present invention relates to a highly conducting polyethylenedioxythiphene (PEDOT) phase on flexible cellulose paper with a very low sheet resistance and high conductivity. Particularly the present invention relates to a process for preparation of highly conducting polyethylenedioxythiphene (PEDOT) phase on flexible cellulose paper through simple roll coating by inducing interfacial polymerization at the interface of two immiscible liquids. More particularly, the present invention relates to the use of the said conducting paper for the preparation of flexible supercapacitor and for the preparation of counter electrode in Dye Sensitized Solar Cell (DSSC).

BACKGROUND OF THE INVENTION

Increasing energy demands in conjunction with the growing emphasis on the need of implementation of environmentally benign technologies have given significant thrust for developing cleaner technologies like dye sensitized solar cells (DSSCs), supercapacitors, Li-ion batteries, fuel cells etc. At the same time, future flexible and light weight electronic and electrical gadgets demand flexibility and weight reduction in the energy managing devices. Lack of flexibility in the present commercial DSSCs, supercapacitors, Li-ion batteries etc, gives major restrictions in integrating such systems with the future electronic and electric devices. Thus, it is highly important to have lighter, thinner and flexible energy converting and storing devices which in turn help the whole electric and electronic devices to become much cheaper and eco-friendly. Exchange of the individual key components such as current collector, electrode material as well as the electrolyte with lighter and flexible alternatives is the key point in the success of such devices. However, this transformation to flexibility and lighter qualities always accompanies with compromise in conductivity and electrochemical activity of the components due to the trade-off between them.

A single material possessing both high electrochemical activity and high flexibility will be promising in this context as it can play the role of both current collector and an electrode material which results in flexible, lighter, thinner, and cheaper energy devices. This approach is very challenging in the present situation due to the lack of materials which possess required conductivity, flexibility and electrochemical activity concomitantly. Among the various materials, flexible metal foils and metal coated flexible substrates possess high conductivity, and, thus, are being used as the current collectors in most of the electrochemical devices. However, issues related to electrochemical activity, cost, corrosion and density make them less viable candidates for such flexible applications. Various carbon morphologies like carbon nanotubes and grapheme are looking very promising due to their low cost and high conductivity. However, large area electrode production from highly graphitized CNT's and graphene is still challenging due to the difficulties associated with processing in solution phase. On the other hand, conducting polymers are promising in this context due to their easy processability, conductivity etc. compared to the carbon analogues.

PEDOT is a versatile conducting polymer among its counterparts owing to its very high theoretical conductivity (>500 S/cm), chemical and physical stability, largeoperable potential window etc. Thus, PEDOT is being used in various photovoltaic cells, Li-ion batteries and supercapacitors. One of the promising applications of PEDOT is in dye sensitized solar cells (DSSCs) to replace costly Pt coated FTO counter electrode. At the same time, due to its high conductivity, extensive researches are also going on to use it as a potential electrode material in supercapacitors.

For flexible counter electrode as well as supercapacitor applications, achieving low sheet resistance for PEDOT on a flexible substrate is necessary. Among the various methods available for the preparation of the PEDOT electrodes, vapour phase, refer Kim, J et al in "The preparation and characteristics of conductive poly(3,4-ethylenedioxythiophene) thin film by vapor-phase polymerization" in *Synth. Met.* 2003, 139, 485-489 reports preparation method of conductive PEDOT film at nano-level thickness on plastic roll film substrates by vapor-phase polymerization. The conductive thin films of ferric chloride doped poly (3,4-ethylenedioxythiophene) were obtained by in situ vapor-phase polymerization method under ambient conditions. The conductivity is also affected by depositing temperature, and strongly depended on the film thickness. It shows the high conductivity to $10^0$ S/cm at 20-100 nm range thickness and up to $10^2$ S/cm at above. The major drawback of said process is that the conductivity heavily depends upon film thickness and higher conductivity ($10^0$ S/cm) can be achieved only at very low thickness (20-100 nm range). The film possessing low thickness does not have significant mechanical integrity and hence cannot be employed for the fabrication of energy storage and/or conversion devices.

Article titled "Preparation and characterization of conductive paper via in situ polymerization of 3,4-ethylenedioxythiophene" by Y Chen et al. published in *BioResources*, 2011, 6(3), pp 3410-3423 reports conductive paper prepared via in situ chemical oxidative polymerization of 3,4-ethylenedioxythiophene (EDOT) in pulp suspension by using iron(III) p-toluenesulfonate (Fe(OTs)$_3$) as both an oxidant and a dopant source. The deposition of poly (3,4-ethylenedioxythiophene) (PEDOT) on the pulp fiber surface was verified and characterized by ATR-FTIR and SEM analyses. The conductivity of the resultant conducting films described in said paper is less due to higher volume fraction of pulp.

Article titled "Fabrication of conductive paper coated with PEDOT: Preparation and characterization" by H Kawashima et al. published in *Journal of Coatings Technology and Research*, 2012, 9 (4), pp 467-474 reports a conductive paper coated with PEDOT by direct polymerization onto a paper sheet. The conductive paper exhibited the electrical conductivity of 1.8 S/cm. A conductive paper was fabricated by the EDOT monomer painting/simultaneous polymerization method for the formation of PEDOT/cellulose composite. The electrical conductivity of the PEDOT-coated paper was estimated to be 1.8 S/cm. The drawback of said process is low mechanical integrity and low conductivity of the resultant PEDOT/cellulose composite which pose limitations during the fabrication of energy storage and/or conversion devices.

A simple and common method compared to the aforementioned methods is direct coating of the chemically synthesized PEDOT on a flexible substrate via various techniques like spin coating, brush coating or bar coating. Main drawback of this method is the low processability and low conductivity of the chemically synthesized PEDOT owing to the fast polymerization rate which leads to disordered and short polymer chains with shorter π conjugation.

Article titled "Fast conductance switching in single-crystal organic nanoneedles prepared from an interfacial polymerization-crystallization of 3,4-ethylenedioxythiophene" by K Su et al. published in *Advanced Material*, 2007; 19(5), pp 669-672 reports the synthesis of single crystals of poly(3, 4-ethylenedioxythiophene) (PEDOT) as nanoneedles, which projected fast, field-induced conductance switching by interfacial polymerization from the 3,4-ethylenedioxythiophene (EDOT).

Article titled "Single-Crystal Poly(3,4-ethylenedioxythiophene) Nanowires with Ultrahigh Conductivity" by B Cho e al. published in *Nano Lett.*, 2014, 14 (6), pp 3321-3327 reports single-crystal poly(3,4-ethylenedioxythiopene) (PEDOT) nanowires with ultrahigh conductivity using liquid-bridge-mediated nanotransfer printing with vapor phase polymerization. The single-crystal PEDOT nanowires are formed from 3,4-ethylenedioxythiophene (EDOT) monomers that are self-assembled and crystallized during vapor phase polymerization process within nanoscale channels of a mold having $FeCl_3$ catalysts. The conductivity of the single-crystal PEDOT nanowires is an average of 7619 S/cm with the highest up to 8797 S/cm which remarkably exceeds literature values of PEDOT nanostructures/thin films.

Article titled "Improvement of Electrical Conductivity of Poly(3,4-ethylenedioxythiophene) (PEDOT) Thin Film" by SH Yu et al. published in *Molecular Crystals and Liquid Crystals*, 2013, 580 (1), pp 76-82 reports effect of doping level and co-dopant on the electrical conductivity of in-situ polymerized poly(3,4-ethylenedioxythiophene) (PEDOT) thin film. PEDOT thin film was fabricated by in-situ polymerization of 3,4-ethylenedioxythiophene (EDOT) as a monomer and iron (III) p-toluenesulfonate (FTS) as the oxidant and the dopant source. The PEDOT films with very smooth surface were successfully fabricated on glass substrates by in-situ polymerization. The prepared PEDOT films showed the conductivity ranging from 700 to 1,000 S/cm.

However, practical issues to produce larger area films as well as the inability to attain comparable coating with a low sheet resistance make PEDOT a less viable choice for conceiving current collector-free electrodes.

As one of the excellent solutions to overcome this issue is the use of a retardant, normally a Lewis base, which slows down the polymerization rate. However, harmful nature of the retardantsandtheir inability to make a significant reduction in the sheet resistance makes the process less viable and attractive.

Even though interfacial polymerization is common for polyaniline, polypyrrole and polythiophene, few reports on the interfacial polymerization are available for PEDOT. Most of the reports utilize surfactants; however, surfactant always has a negative impact on the conductivity of the formed PEDOT. Yang et al (Su, K.; Nuraje, N.; Zhang, L.; Chu, I. W.; Peetz, R. M.; Matsui, H.; Yang, N. L. *Adv. Mater.* 2007, 19, 669-672) prepared a semi conducting PEDOT nano-needles in solution at water/dichloromethane interfaces. However, lengthy reaction time (3 days) and poor yield are the main limitations of the solution method.

Therefore, there is need to provide an efficient and cost-effective process for preparation of highly conducting PEDOT electrodes with low sheet resistance on a flexible substrate and will overcome drawbacks of prior art. Accordingly, present inventors developed a process for preparation of highly conducting PEDOT cellulose paper with low sheet resistance and high conductivity.

OBJECTIVE OF THE INVENTION

The main objective of the present invention is to provide a a pedot coated flexible cellulose paper.

Another object of the present invention is to provide a process for preparation of highly conducting polyethylenedioxythiphene (PEDOT) flexible paper with a very low sheet resistance and high conductivity by inducing interfacial polymerization at the interface of two immiscible liquids.

SUMMARY OF THE INVENTION

Accordingly the present provides a conducting polyethylenedioxythiphene (PEDOT) coated flexible cellulose paper having conductivity in the range of 375-400 S/cm.

In an embodiment of present invention, the conducting paper is useful for the preparation of flexible supercapacitor and counter electrode in Dye Sensitized Solar Cell (DSSC).

In another embodiment, present invention provides a process for the preparation of highly conducting polyethylenedioxythiphene (PEDOT) coated flexible cellulose paper comprising the steps of:
a) roll coating the paper with $FeClO_4$ in water to obtain coated paper;
b) interfacial polymerization of the coated paper as obtained in step (a) by roll coating with 3,4-ethylenedioxythiphene (EDOT) in organic solvent to obtain single coated conducting paper;
c) repeating steps (a) and (b) 5-8 times to obtain multi-coated conducting paper.

In still another embodiment of present invention, the interfacial polymerization is carried out at temperature in the range of 25-30° C.

In yet another embodiment of present invention, the interfacial polymerization is carried out for a time period in the range of 1 to 3 hrs.

In still another embodiment of present invention, the organic solvent used in step (b) is n-butanol.

In still another embodiment of present invention, the sheet resistance of the single coated conducting paper as obtained in step (b) is in the range of 20-26 Ω/m and the resistance of multiple coated conducting paper as obtained in step (c) in the range of 2 to 4 Ω/m.

In still another embodiment of present invention, the paper used is cellulose paper.

BRIEF DESCRIPTION OF THE DRAWINGS

FIG. 1 depicts a) Schematic representation of the synthetic strategy adopted for the PEDOT-paper preparation, b) larger area PEDOT-paper (40 cm×25 cm) made from the present strategy, c) image showing the surface of the clean scotch tape after peeling it from PEDOT-paper surface, d) image of a thin all-solid-state flexible capacitor made from the PEDOT-paper having a thickness of 0.17 mm and e) image of 3.6 V inter-digit supercapacitor made from a single layer PEDOT-paper which glows an LED under flexible conditions.

FIG. 2 depicts a) Variations in the sheet resistance with respect to the number of layers of PEDOT on the paper, b) a plot representing the change in sheet resistance w.r. to time, while keeping the PEDOT paper under ambient conditions (inset shows the contact angle of water on the PEDOT paper), and c) conductivity variations under various flexible conditions.

FIG. 3 depicts SEM images of a) and b) PEDOT-paper formed by interfacial polymerization, c) PEDOT-p-bulk formed when complete reaction happened in pure n-butanol, d) bare cellulose paper. e) and f) TEM images of PEDOT formed through interfacial polymerization.

FIG. 4 depicts a) XRD spectra and b) UV-visible spectra of various samples. S2p XPS spectra of c) PEDOT-p and d) PEDOT-bulk.

FIG. 5 depicts a) Cyclic voltamograms recorded at 50 mV/s, b) charge-discharge (CD) profiles of PEDOT-p taken at a current density of 0.4 mA/cm$^2$ with different layers of the PEDOT coating, c) enlarged view of the CD profiles given in 'b' indicating the differences in the IR drop, d) areal capacitance measured for the various PEDOT-p, e) CD profiles of PEDOT-p-5 taken at various current densities and f) graphical representation of the capacitance changes of PEDOT-p-5 with respect to the varying current density values.

FIG. 6 depicts a) Nyquist plot of the flexible device made from PEDOT-p-5 with the enlarged high frequency region along with the circuit diagram is given in the inset, b) CD profile of the PEDOT-p at a various bending and flexible conditions and c)-d) represent the long-term cycle stability data.

FIG. 7 depicts a) CD profiles of the inter-digital supercapacitor in a voltage window of 3.6 V at various bending and flexible conditions and b) Ragone plot; inset image shows the thickness of the sandwiched device.

FIG. 8 depicts a) CV profiles recorded at a scan rate of 10 mV/s and b) Tafel polarization plots in the asymmetrical dummy cell.

FIG. 9 depicts I-V polarization curve of a solar cell using the PEDOT paper as the counter electrode in comparison with Pt/FTO.

FIG. 10 depicts a) PEDOT polymerization on cellulose paper through various solvent combinations. B) Optical images of the corresponding PEDOT paper.

FIG. 11 depicts CV profile at 10 mV/s of PEDOT-bulk and coated on a solid current collector.

DETAILED DESCRIPTION OF THE INVENTION

The present invention provides an efficient and scalable method to prepare highly conducting PEDOT flexible paper which possesses a very low sheet resistance, wherein said method comprises inducing the polymerization at the interface of two immiscible liquids on a cellulose paper to trigger PEDOT growth along the fibers of the cellulose paper.

This type of substrate assisted alignment is found to have a key impact on the conductivity as well as the electrochemical activity of the PEDOT films. The prepared PEDOT film possess highly ordered polymer chains and increased doping level, which help the paper to display excellent conductivity even at flexible conditions. The prepared film adheres strongly to the substrate and retains the flexible nature of the cellulose paper and maintains long-term stability on the conductivity.

The present invention provides a process for preparation of highly conducting polyethylenedioxythiphene (PEDOT) flexible paper, wherein said process comprising the steps of:
a) Roll coating the paper with $FeClO_4$ in water;
b) Roll coating the paper of step (a) with EDOT in suitable organic solvent;
c) Allowing a process of interfacial polymerization to occur to afford highly conducting paper,
Characterized in that, conductivity of the said paper is up to 400 Siemens/cm.

The steps (a) and (b) are repeated to afford multilayer conducting paper. The interfacial polymerization is carried out at temperature in the range of 25-30 deg C. The said interfacial polymerization is carried out for a period in the range of 1 to 3 hrs.

The organic solvent in step (b) selected from n-butanol. The conductivity of said conducting paper is 375 Siemens/cm. The sheet resistance of said conducting paper is in the range of 3 to 26 Ω/cm. The said conducting paper is cellulose paper The conducting paper is used for the preparation of flexible supercapacitor. The conducting paper is also used for the preparation of counter electrode in Dye Sensitized Solar Cell (DSSC).

Due to the hydrophilic nature of $FeClO_4$, there will be always a thin layer of water associated with it and this creates an interface which is immiscible with EDOT/n-butanol. Thus, formation of this interface controls the growth kinetics of PEDOT and ensures an aligned and thin coating the fibers of the paper by the polymer. Schematic representation of the synthetic procedure adopted in the present invention is shown in FIG. 1a. One of the key highlights of the synthetic strategy adopted here in the invention is its scalability compared to other methods. PEDOT film impregnated flexible paper (hereinafter called PEDOT-p) may be prepared in a scalable way by bar coating. Photograph of a prepared PEDOT-p having an area of 40 cm×25 cm is shown in FIG. 1b. The PEDOT layer attains strong adhesion with the substrate as revealed from the scotch tape experiment (FIG. 1c).

The sheet resistance and conductivity is measured using the four-probe method. The sheet resistance obtained for PEDOT-p-1 is 24 Ω/m (FIG. 2a), which could be further reduced up to 3 Ω/m (PEDOT-p-5) by multiple coatings. For comparison, the inventors have prepared PEDOT by dissolving both EDOT and $FeClO_4$ in pure n-butanol on the cellulose paper (PEDOT-p-bulk) using the same protocol. Due to the poor control on the polymerization process in this case, the sheet resistance has been shoot up to 10 MΩ/m, compared to 24 Ω/m for PEDOT-1. The measured conductivity of PEDOT-p-5 is 375±25 S/cm, considering the thickness of the PEDOT film as 8±1 μm. For comparative studies, inventors prepared PEDOT powder from pure n-butanol by normal solution method, which hereafter is termed as PEDOT-bulk. Compared PEDOT-p (375±25 S/cm), the conductivity of PEDOT-bulk is only 30 S/cm. The observed low sheet resistance of PEDOT-p-5 is stable even up to 90 days under ambient conditions (FIG. 2b). This conductivity retention is far better than a previous report and the PEDOT prepared using a wet chemistry method. High hydrophobic nature of the PEDOT paper, which repels the water moisture from entering its matrix, helps for displaying the stability at the ambient conditions. Contact angle measurement shows its hydrophobic nature with a water contact angle of 131°, which is much higher than that displayed by PEDOT-bulk (55°) and samples listed in the previous few reports (inset of FIG. 2b). Further, inventors carried out the I-V (current-voltage) measurement of the PEDOT paper at various bending and twisting conditions and it is found to be very stable, even with twisted and bending conditions where superimposed IV-plots are obtained (FIG. 2c). The minimum sheet resistance obtained in the present case is 3 Ω/m, which is much lower than the sheet resistance displayed by the present ITO and FTO coated glass (7-14 Ω/m) and Au sputtered substrates (5 Ω/m for a 30-35 nm thick Au).

The scanning electron microscope (SEM) images of FIG. 3a shows the surface morphology of the bare cellulose paper, where the surface of the paper is found to have micron sized cellulose fibers. After the PEDOT coating, the surface morphology does not have any visible changes at low resolution (FIG. 3b). This is due to the uniform coating of PEDOT along the cellulose fibres rather than at the vacant spaces. This may be explained from the hydrophilic interaction between the —OH groups in the cellulose with $FeClO_4$. This eventually helps the PEDOT for polymerization only on the fiber surface. Due to the same reason, the formed PEDOT displays strong adhesion to the substrate in such a way that the polymer layer could withstand while trying to peel it out with the help of a scotch tape (FIG. 1c). This type of strong interaction is not observed in most of the PEDOT films formed by the conventional ways due to the lack any interaction between the substrates and the PEDOT films. At higher magnification (FIG. 3c), the image clearly indicates that the PEDOT layer possesses mostly a fiber type growth pattern having an average thickness of 200-300 nm and length of several micrometers. FIG. 3d shows the SEM surface images corresponding to the PEDOT-p-bulk. It is clearly visible in this case that the PEDOT is not formed uniformly, rather it has short and orderless bulk PEDOT structure with relatively low yield.

The Transmission electron microscopy (TEM) images of the instant PEDOT as shown in FIGS. 3e & 3f reveals that PEDOT formed during interfacial polymerization according to the invention possesses 3-D porous structures.

The XRD spectra (FIG. 4a) shows two strong peaks at 15.7 (110) and 22.5° (002) for the cellulose paper, which are the characteristic peaks of cellulose Apart from the above peaks, characteristic peaks of PEDOT at 6.7 and 26.3°, corresponding to the (100) and (002) planes, respectively, are visible in the PEDOT paper and PEDOT-bulk. The (100) spacing is in relation with the inter-π-conjugated chain distance of the stacked PEDOT polymer. Interestingly, the relative intensity of the (100) to (020) planes is high (3.5) in the PEDOT paper compared to that in the bulk PEDOT (1.1). This serves as an indirect evidence for the existence of more ordered PEDOT chains, which helps for the better inter-chain interaction and, thereby, efficient charge-hopping between the chains compared to PEDOT-bulk.

More conclusive evidence about the level of doping has been obtained from the sulphur XPS spectra of PEDOT-bulk and PEDOT-paper presented in FIGS. 4c and d, respectively. The deconvoluted peaks appeared at 162.3 and 163.6 eV correspond to the S2p3/2 and S2p1/2 states, which shows a ratio of 2:1 for the area under the peak and a B.E difference of 1.3 eV. The third peak (166.3 eV) correspond to the partially oxidised sulphur ($S^{δ+}$), which is balanced by the doped counter ion either $ClO_4^-$ or $Cl^-$. Remarkable difference is found in the relative intensity of $S^{δ+}$ with neutral S in PEDOT-paper, indicating the pronounced doped counter ion. Quantification of doping level is done by taking the ratio of area under the peak of Cl 2p to S 2p, which is found to be 0.32 in case of PEDOT-p and 0.23 for PEDOT-bulk (Table 1 and 2).

TABLE NO. 1

| Peak parameters of PEDOT-p | | | |
|---|---|---|---|
| Peak | Position (eV) | Area | FWHM (eV) |
| 0 (S2p 3/2) | 162.325 | 2983.912 | 1.791 |
| 1 (S2p 1/2) | 163.636 | 1421.953 | 3.620 |
| 2 ($S^{δ+}$) | 166.271 | 2026.226 | 4.29 |
| Cl 2p | 206.558 | 2702.512 | 2.842 |

TABLE NO. 2

| Peak parameters of PEDOT-bulk | | | |
|---|---|---|---|
| Peak | Position (eV) | Area | FWHM (eV) |
| 0 (S2p 3/2) | 162.316 | 12945.400 | 1.954 |
| 1 (S2p 1/2) | 163.737 | 6291.283 | 2.039 |
| 2 ($S^{δ+}$) | 166.200 | 5619.563 | 4.575 |
| Cl 2p | 206.234 | 7880.315 | 3.271 |

Further, enhanced doping implies more π-conjugation which will lead to red shift in the absorption in the UV-visible spectra. As expected, in the interfacial polymerized PEDOT, a clear red shift has been observed due to higher doping compared to PEDOT-bulk (FIG. 4b). Insufficient doping in PEDOT-bulk could also be confirmed from the less intense peak at around 560 nm, which is a trademark of the π-π* transition of neutral PEDOT, and will vanish after complete oxidation as occurred in the interfacial polymerized PEDOT sample. Thus the above two critical factors helps for PEDOT-p to achieve a high conductivity of 375 S/cm compared to 31 S/cm obtained for PEDOT-bulk as measured by the DC four-probe method.

FIGS. 5a and 5b show the CV and CD profiles obtained from solid-state devices made from PEDOT-p-1 to PEDOT-p-5. Capacitance properties are found to be improving linearly with increasing the PEDOT layer in the paper due to the increasing amounts of PEDOT as well as due to the progressively reduced sheet resistance. Areal capacitance is found to be increased from 28 $mF/cm^2$ to 115 $mF/cm^2$ while the coating is increased from 1 layer to 5 layers (FIG. 5d). The PEDOT amount on the 5 layered PEDOT paper (i.e. PEDOT-p-5) is around 1 $mg/cm^2$ and the corresponding mass specific capacitance is estimated to be 115 F/g, which is substantially higher than that measured on the system derived from PEDOT-bulk (60 F/g) (tested by coating on a carbon paper, FIG. 11). Considering the highest capacitance registered by the system derived from PEDOT-paper. The detailed investigations are restricted by focusing on this system. The capacitance measured by the device made from PEDOT-p-5 is much higher or even comparable to values reported in the literature on the PEDOT based capacitors using solid current collectors (Table 3). Rather than mass specific capacitance, it is desirable to state the capacitance in volumetric and areal density, as they are the two important parameters for judging the feasibility of the material for practical usage. A volumetric capacitance of 144 $F/cm^3$ is obtained at a current drag of 0.5 $A/cm^3$ by considering the thickness of PEDOT as 8 µm in PEDOT-paper-5 (FIG. 5f). This value of capacitance is much higher compared to the values available for the recent literatures (a comparative literature data is tabulated in Table 3). Even at a high current drag of 10 $A/cm^3$, the present system retains up to 90 $F/cm^3$ (details are given in FIGS. 5e and 5f), indicating the superior power rate of the device. Apart from the high conductivity of PEDOT (>375 S/cm), the porous structure as found in TEM also helps for maintaining the high capacitance by achieving high electrode-electrolyte interface during the intercalation of the polymer gel electrolyte.

TABLE 3

Comparative literature survey

| Electrode | Energy density | Power Density | Window (V) | Current collector |
|---|---|---|---|---|
| PEDOT-cellulose paper Current Work* | 1 mWh/cm$^3$ 28 mWh/cm$^3$ | 0.05 W/cm$^3$ 1.52 W/cm$^3$ | 1.2 | No current collector |
| Transparent carbon film | 47 µWh/cm$^3$ | 19 mW/cm$^3$ | 1 | No current collector |
| H—TiO$_2$ @MnO$_2$ | 0.30 mWh/cm$^3$ | 0.23 W/cm$^3$ | 1.5 | Carbon cloth |
| H—TiO$_2$ @C Core-Shell | 59 Wh/kg | 45 kW/kg$^1$ | | |
| PANI/Au/Paper | 10 mWh/cm$^3$ | 3 W/cm$^3$ | 0.8 | Au coated Paper |
| NPG-PPy | 19 mWh/cm$^3$ 2.8 mWh/cm$^3$ | 283 W/cm$^3$ 56.7 W/cm$^3$ | 0.75 | Porous Gold electrode |
| Hetero doped Graphene | 16.9 mWh/cm$^3$ | 4560 W/cm$^3$ | 1 | Au Current collector |

The inventors have further pushed the devices for stringent stability test at various bending and flexible conditions. Initially, CD profile is measured at various bending and twisted conditions (FIG. 6b) and the data is found to be closely superimposable. Due to the highly flexible nature of the individual components like cellulose, PEDOT and PVA-H$_2$SO$_4$ gel, the device appears quite robust to the various flexible conditions. Further, long-term stability test is carried out under normal condition for 2500 cycles by applying continuously a current density of 2 mA/cm$^2$. The performance of the system is found to be very stable (~9% degradation) while maintaining high coulombic efficiency (~99%) throughout the cycles. Long-term cycle stability of the devices at various bending and twisted conditions also is monitored and found to be very stable even after 3800 cycles. Small degradation found in capacitance is due to the loss of water from the gel due to the heat generation during the cycles, which wehighlighted in our previous reports as well. The energy density and power density of the device are calculated and the values are tabulated in the form of a Ragone plot in FIG. 7b. A maximum energy density of 28 mWh/cm$^3$ is obtained for the PEDOT. The above value obtained for the PEDOT is quite higher compared to many of the flexible thin supercapacitors listed in the recent literature (Table 3). The inventors also have calculated the energy density and power density by considering the whole device thickness (0.17 mm, FIG. 8b) and the value is found to be ~1 mWh/cm$^3$ at a power density of 52 mW/cm$^3$ and the system could retain an energy density of 0.61 mWh/cm$^3$ even at a higher power drag condition of 1 W/cm$^3$.

As mentioned in the previous embodiments, large scale production of PEDOT paper is simple and may be improvised into various designs and shapes. It should be noted that the total device thickness is only 0.17 mm which includes electrode, electrolyte and separator in the integrated form. However, that this thickness may be further reduced by reducing the thicknesses of the polymer electrolyte (0.1 mm) and cellulose paper (0.6 mm), which come around 90% of the total thickness in the present device. An inter-digital flexible solid-state-supercapacitor is made from a PEDOT paper with a working potential of 3.6 V (FIGS. 1e and 7a). The device consists of 3 capacitors connected in series in a single PEDOT paper where, the PEDOT phase itself acts as the electric connector between them. The CD profile of the device is shown in FIG. 7a and the image of the glowing LED using the device in the flexible condition is shown in the inset of FIG. 7a. Similar to sandwiched supercapacitor, inter-digital supercapacitor has also been found to be very stable to the flexible conditions, where the CD profiles are superimposable in the bending and twisting conditions. Therefore, the method of preparation of highly conducting PEDOT-p of the instant invention may be further extended to screen printing and may be used to prepare designer flexible supercapacitors.

FIG. 8a shows the CV profiles of PEDOT-p-3 to PEDOT-p-5 recorded at a scan rate of 10 mV/s. As indicated in the FIG. 8a, first redox peaks corresponds to the I$^-$/I$_3^-$ redox couple and second one corresponds to I$_3^-$/I$_2$ couple. Among the various samples, PEDOT-p-4 possesses the highest reduction current as well as the lowest difference between the potential at reduction and oxidation peak current maxima for I$^-$/I$_3^-$ couple, which are characteristics of the high catalytic activity towards the tri-iodide reduction. Further, square root of the scan rate has a linear relationship with the peak current density in the case of PEDOT-p-4, indicating the involvement of a diffusion limited reaction and absence of any interaction of ions with the substrate. Thus, inventors have selected PEDOT-p-4 as the right candidate for deploying as the counter electrode in real DSSC measurements. Before going to a real cell, inventors further confirmed the activity of PEDOT-p-4 by using Tafel polarisation using symmetric cell at a scan rate of 10 mV/s. It may be seen that PEDOT-p-4 displays similar limiting current as that of the standard Platinum coated FTO (Pt/FTO). However the exchange current density which measured at lower over potential is high for Pt/FTO (2.2 mA/cm$^2$) than PEDOT-p-4 (1.2 mA/cm$^2$). This deviation arises due to the movement of I$_3^-$ and I$^-$ inside the PEDOT matrix during the redox reaction, which is hampering the electrical conductivity of PEDOT. A real DSSC cells are fabricated using PEDOT-p-4 as the counter electrode and FTO/TiO$_2$/Dye as working electrode (details of the cell fabrication is given in experimental section). Cell's I-V polarisation plots are given FIG. 9a. An overall solar conversion efficiency of 6.5% has been obtained for the system derived from PEDOT-p-4 compared to 7% efficiency displayed by the system having Pt/FTO as the counter electrode. Coming to the individual parameters, PEDOT-p-4 based system shows superior fill factor of 66% compared to 62% of the system made from Pt/FTO, indicating the high catalytic activity. However, lower short circuit density ($J_{sc}$) of 13 mA/cm$^2$ in comparison to 15 mA/cm$^2$ of Pt is deleteriously effect the overall efficiency of the present flexible counter electrode. Lower open circuit potential (OCV) and low $J_{sc}$ arises as there is no external current collector, rather catalyst should play the dual role of I$_{3-}$ reduction and charge mobility. However the presented flexible material is still promising due to its comparable catalytic activity with costly Pt coated FTO. Thus, PEDOTpaper-4 shows great potential to replace Pt and TCO from the counter electrode. Different PEDOT paper used cell test data are given in Table 4, in which PEDOT-4 is showing superior activity in accordance with the CV data.

TABLE 4

IV measurement parameters

| Sample | Voc | Fill Factor | Jsc mA/cm$^2$ | % Efficiency |
|---|---|---|---|---|
| PEDOT-p-3 | 0.67 | 68.36 | 9.83 | 4.53 |
| PEDOT-p-4 | 0.74 | 66.45 | 13.06 | 6.46 |
| PEDOT-p-5 | 0.66 | 70.50 | 11.86 | 5.55 |

EXAMPLES

Following examples are given by way of illustration therefore should not be construed to limit the scope of the invention.

Example 1

Preparation PEDOT Paper

In a typical preparation method, a butter paper having an area of 9×11 cm$^2$ was placed over a bar coater and 340 mg of FeClO$_4$ in 0.5 ml water was coated over it using a rod with a groove spacing of 40 µm at a speed of 3 meter/minute. The paper was kept for drying at 25 deg C. Further 25 µl of EDOT in 0.5 ml n-butanol was bar coated over FeClO4 coated paper with the same speed. The paper was left for drying and polymerization. After 2 h, the paper was washed several times in ethanol until the excess FeClO4 was removed. The paper was dried and smoothened by keeping in a press (Carver) at a pressure of 12 MT for 2 min. For achieving a low sheet resistance, the process is repeated several times. From the second layer onwards, the FeClO4 was coated initially in n-butanol instead of water as the PEDOT layer is hydrophobic. After drying out the n-butanol, the paper was kept under a humidity chamber by maintaining a relative humidity of 70% for 15 min. for allowing FeClO4 to absorb water. Except this step, all the remaining processes are kept same as that of the first coating step.

Example 2

Preparation of PVA-H$_2$SO$_4$ Solutions and Film 1 g of PVA was dissolved with vigorous stirring at 85° C. for 2 h in 50 ml RB containing 10 ml of de-ionized water. The above solution was left for cooling to room temperature and at this stage, drop-wise addition of 1.0 g H$_2$SO$_4$ was carried out under stirring condition. Viscosity of the obtained solution was 0.6×105 Pa·s.

Example 3

Prototype Flexible Supercapacitor Fabrication

The above prepared PEDOT paper was laminated using a PVA film (2 µm) by hot pressing at 120° C. for 2 min on the non-conducting side. The laminated PEDOT paper was then cut into pieces having specific areas (here 2.5 cm2) and is coated with a PVA-H2SO4 solution using a bar coater. Small region was left vacant for giving electrical contacts. The space kept for the electrical contact in the butter paper was coated with Ag paste. For making inter-digital supercapacitor, PEDOT paper was cut into specific dimensions and sealed in a PVA films. 3-cell was made in a single paper in series with total size of 14 cm×3.8 cm which includes the free space between the electrodes.

Example 4

Characterization of Electrode and Cellulose Substrate

Structure and morphology of the materials was analysed by Quanta™ Scanning Electron Microscope and Nova Nano SEM 450. High-resolution transmission electron microscope (HR-TEM) was carried out in Tecnai-T 30 at an accelerated voltage of 300 kV. Philips X'pert pro powder X-ray diffractometer (Cu Kα radiation, Ni filter) was used for X-ray Diffraction (XRD). X-ray Photo electron Spectroscopic (XPS) measurements were carried out on a VG Micro Tech ESCA 300° instrument at a pressure of >1×10-9 Torr (pass energy of 50 eV, electron take off angle of 60° and the overall resolution of ~0.1 eV) Horiba JobinYvon Inverted Lab RAM HR800 VIS-NIR using 532 nm solid state diode laser beams was used for Raman analysis. All the electrochemical studies were carried out in a BioLogic VMP3 multichannel Potentio-Galvanostat. The CV measurements were taken at different scan rates from 10 to 100 mV/s by maintaining a potential window of 1.2 V for single devices. The charge-discharge measurement was done at different current densities (0.5 to 10 mA) in the potential range of 0-1.2 V. Cycling stability was done by chrono charge-discharge method at a current density of 5 mA for 2500 continuous cycles and followed by 3800 cycles including bending and twisted modes. Electrochemical impedance (EIS) analysis was carried in an a.c frequency range of 106-0.01 Hz in the open circuit potential with a sinus amplitude of 10 mV (Vrms=7.07 mV). All the EIS data were analysed and fitted using an EC-Lab Software V10.19. Inter-digital flexible capacitor is tested by charge discharge method at current density of 0.5 mA in a voltage window of 3.6 V in bended, flexible and folded modes. Four-probe conductivity meter having a probe spacing of 0.2 mm were used for electrical conductivity measurements. Conductivity changes in flexible conditions were measured by 2 probe method using linear sweep voltametry (LSV).

Example 5

Counter Electrode Characterization

The CV measurements were carried out in distilled acetonitrile containing 0.1 M LiClO4, 5 mMLiI and 0.5 mM 12 under N2 atmosphere. A 3-electrode setup was used for the CV measurement in which the prepared counter electrode for DSSC was used as the working electrode and Pt wire which was internally calibrated using ferrocene/ferrocenium (Fc/Fc+) couple was used as the reference electrode. 0.64 cm2 area of PEDOT-p working electrode was exposed to electrolyte by masking and remaining portion with adhesive tape. Pt foil was used as the counter electrode. Tafel measurements were done in symmetrical cell in which potential was polarised from −1 to +1 V at a scan rate of 10 mV/s.

Example 6

Dye Sensitized Solar Cell (DSSC) Fabrication

A previous reported method was used for making Standard P25 paste. FTO working electrode, were washed by ultra-sonication in soap solution, deionized water and absolute ethanol. The P25 paste was doctor bladed on the washed FTO until 12-13 microns was achieved by multiple coatings followed by annealing for 1 h. Following a previous method, TiCl4 treatment was done over the working electrodes and flowed by heating at 450° C. for 30 min. The working electrodes were socked in 0.5 mM N719 dye solution for overnight. DSSCs were assembled using a sandwich assembly of the working electrode and flexible PEDOT counter electrode. The electrolyte used was a mixture of 1 M DMPII, 0.05 M LiI, 0.05 M I2 and 0.5 M tert-butyl pyridine. I-V (current vs. voltage) measurements were done under Newport Solar Simulator attached to Keithley 2420 source meter.

ADVANTAGES OF THE INVENTION

1. Easy to scale up
2. Variety of application possible

The invention claimed is:

1. A conducting polyethylenedioxythiphene (PEDOT) coated flexible cellulose paper obtainable by inducing polymerization at the interface of two immiscible liquids on a cellulose paper to trigger PEDOT growth along the fibers of the cellulose paper, wherein the PEDOT coated flexible cellulose paper has a conductivity in the range of 375-400 S/cm.

2. The conducting paper as claimed in claim 1, wherein said paper is useful for the preparation of flexible supercapacitor and counter electrode in Dye Sensitized Solar Cell (DSSC).

3. A process for the preparation of highly conducting polyethylenedioxythiphene (PEDOT) coated flexible cellulose paper comprising the steps of:
   a) roll coating a paper with $FeClO_4$ in water to obtain a coated paper;
   b) interfacial polymerization of the coated paper as obtained in step (a) by roll coating with 3,4-ethylenedioxythiophene (EDOT) in an organic solvent to obtain a single coated conducting paper;
   c) repeating steps (a) and (b) 5-8 times to obtain multi-coated conducting paper.

4. The process as claimed in claim 3, wherein the interfacial polymerization is carried out at temperature in the range of 25-30° C.

5. The process as claimed in claim 3, wherein the interfacial polymerization is carried out for a time period in the range of 1 to 3 hrs.

6. The process as claimed in claim 3, wherein the organic solvent used in step (b) is n-butanol.

7. The process as claimed in claim 3, wherein sheet resistance of the single coated conducting paper as obtained in step (b) is in the range of 20-26 Ω/m.

8. The process as claimed in claim 3, wherein sheet resistance of the multiple coated conducting paper as obtained in step (c) in the range of 2 to 4 Ω/m.

9. The process as claimed in claim 3, wherein the paper that is used is a cellulose paper.

* * * * *